July 6, 1965 D. R. TOMKO 3,193,066
NO-BACK COUPLINGS
Filed April 18, 1963

INVENTOR.
DONALD R. TOMKO
BY
ATTORNEY

United States Patent Office 3,193,066
Patented July 6, 1965

3,193,066
NO-BACK COUPLINGS
Donald R. Tomko, Euclid, Ohio, assignor to Curtiss-Wright Corporation, a corporation of Delaware
Filed Apr. 18, 1963, Ser. No. 274,022
3 Claims. (Cl. 192—8)

The present invention relates to a no-back coupling mechanism of the type employing self-energizing helical friction spring members operable as brake elements against normal stationary brake drums, so as to be capable of enabling transmission of torque as from a control or input shaft to a load-connected shaft while effectually preventing back drive in at least one angular direction from the load-connected shaft to the control or input shaft.

The present coupling mechanism as shown herewith operates bi-directionally or reversibly to prevent transmission of torque from output toward input in two directions with substantially zero backlash, being thus operationally the same as in the "B.D.N.B." unit shown and described in United States Patent 2,947,278 dated August 2, 1960, issued to the assignee of the present application, reference being directed particularly to FIGS. 2, 3 and 4 in said patent.

In the above referenced construction, each of two axially aligned helical friction springs around mutually telescoping end portions of the shafts is arranged to be effectually released from its normally tightly seated or locking position on the associated brake drum surface via a cross-pin on the input shaft arranged for positively but loosely connecting the two shafts, the cross-pin acting on an adjacent abutment member of one spring to effect its release while the other spring simply overruns idly on its associated braking surface. Each spring-releasing operation thus inherently requires backlash or lost motion (input toward output); and, when the unit is used in a manual steering mechanism including reduction gearing between e.g., a steering wheel and operating linkage connected to road wheels, the lost motion involved is undesirable. The principal object of the present invention is to reduce the input-toward-output lost motion to a practical minimum without substantially increasing cost and without interference with the desired operations of the unit.

Objects and features not indicated above will be brought out or made apparent in the following description. The essential characteristics are summarized in the appended claims.

In the drawing FIG. 1 is a longitudinal central sectional view of a B.D.N.B. unit incorporating a preferred form of the present improvement.

Figure 1:
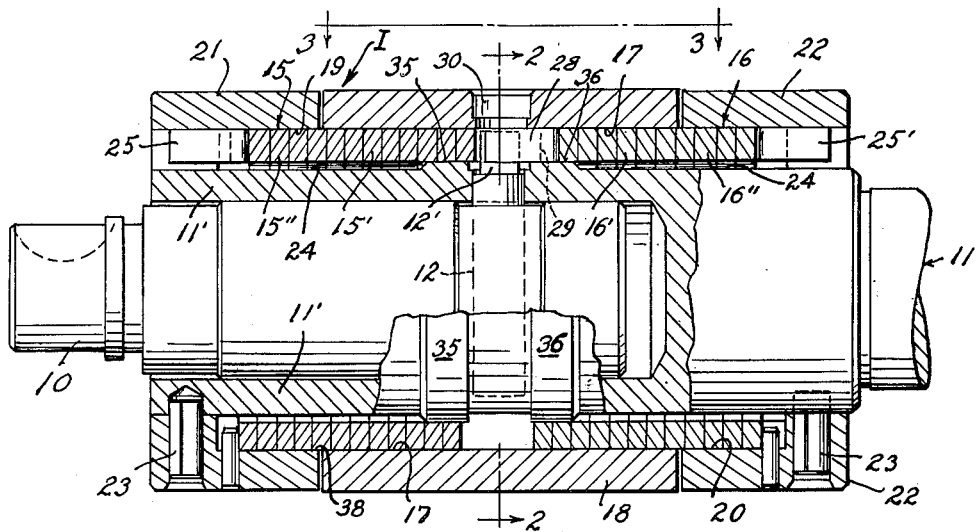
Figure 2:
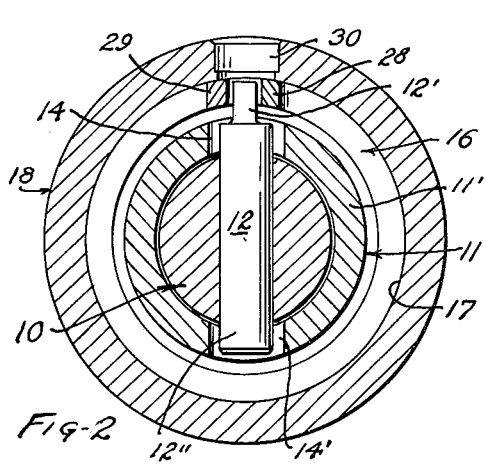
FIG. 2 is a transverse sectional view taken as at 2—2 on FIG. 1.

In FIGS. 1 and 2 the input shaft 10 of B.D.N.B. unit or assembly I telescopes a tubular head portion 11' of output shaft 11, and the two shafts are interconnected axially and otherwise by a cross pin 12 tightly secured in an appropriate cross bore of shaft 10 and with its end portions 12' and 12" extending radially into somewhat circumferentially elongated cross bore portions 14 and 14' (see FIG. 2) in diametrically opposite wall portions of shaft 11. The cross pin thus couples the shafts for positive torque transmission but with predesigned limited free play bidirectionally from an assumed normal angularly related position (FIG. 2) of the two shafts.

The helical springs 15 and 16 are similarly wound, i.e. same "hand"; have their proximal or relatively adjacent coils 15' and 16' preloaded against an internal cylindrical braking surface 17 of a tubular brake drum member 18, and distal or relatively remote coils 15" and 16" of the springs are tightly preloaded in internal drum surfaces 19 and 20 of respective internally stepped collars 21 and 22 which are suitably secured to the output shaft 11—e.g., by radial pins 23 as in said patent.

Most of the coils of both helical springs 15 and 16, as shown, loosely surround associated external cylindrical surfaces 24 of the output shaft 11 coaxially therewith. The distal end coils of the springs are connected as shown to the respective collars 21 and 22 by axial toes 25 and 25' of respective springs occupying internal axial grooves formed in the collars.

Figure 3:
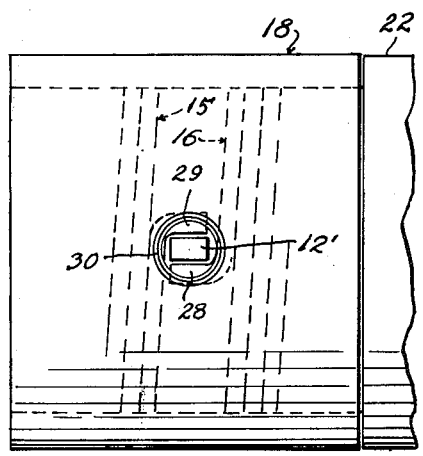
FIG. 3 is a fragmentary elevation, viewed as at 3—3 on FIG. 2.

During assembly of the coupling I and before the holes for the pins 23 have been formed, the springs 15 and 16 are turned coaxially by manipulation of the collars 21 and 22 so that axially projecting toe or abutment portions 28 and 29 of their proximal end coils 15' and 16' respectively lie symmetrically on opposite sides of the adjacent flat-formed spring-controlling end portion 12' of the cross pin 12 (see FIG. 3) which end portion and the toes, by appropriate prelocation of the springs and the rest, are exposed through an opening 30 in the brake drum member 18 to enable accurate gaging of the clearances between the toes 28 and 29 and the respective adjacent sides or spring-control-abutment surfaces of the cross-pin.

The unit I is usually mounted in a suitable sleeve or housing, not shown, which via appropriate means secures the drum member 18 against rotation about its longitudinal axis and to provide support for the output shaft 11 via its collars 21 and 22 which turn freely in the sleeve or housing.

If the unit I is made, as in said patent, and as is usual, with approximately uniform fairly large radial clearance between all the coils of the two helical springs and the external cylindrical surface 24 of the output shaft, such that the coils of each spring will certainly be permitted to move completely out of gripping relation to the associated brake drum surface portions 17 incident to the angular movement of the cross pin 12 out of normal position the necessary amount to take up the play between the cross pin and the elongated slots 14 and 14', considerable portions of each angular movement of the cross pin 12 out of its normal position (FIG. 2) will have no useful result other than to deflect somewhat more than half the circumferential length of the coil engaged by the cross pin via the spring toe toward the common axis of the shafts 10 and 11, such free end behaving as a cantilever. In the improved construction, FIG. 1, plateaus 35 and 36 which, optionally, extend completely around the output shaft "under" the associated free end coils of the springs 15 and 16, block nearly all such idle cantilever deflections of the end coils. Thereby when the cross-pin portion 12' engages, for example, the toe 29 of spring 15 during angular movement of the cross-pin out of neutral position, contraction of the other coils of spring 15 occurs simultaneously or with negligible lag until the highest-loaded coil (at the crossover region 38 of spring 15) is contracted and caused to slip on the associated brake drum surface 17.

As soon as the spring 15 is deenergized in the just above described example of operation, the coils of the other spring (16) are then substantially simultaneously caused to overrun on the brake drum 18 by torque imparted by the output shaft 11 via the high friction of coils preloaded in the collar 22. Thus, no delay or lag incident to cantilever deflection of the distal end coil of spring 16 occurs. Operation of the coupling in the opposite angular direction is simply the reverse of that described above. The reason for providing two ribs 35 and 36 on the ouput shaft head portion 11' is to afford ample clearance for the spring toes 28 and 29 in case either toe is inaccurately formed so that it is inclined toward the axis of rotation of the coupling.

It will be evident from the above that prevention of cantilever-like deflection of the "control" end portions of the springs can be attained in other ways than as illustrated in FIG. 1, although usually at greater expense. For example, instead of forming the plateaus 35 and 36 as ribs extending completely around the free end coils of the springs they can be circumferentially spaced apart radial projects (pads), not shown, on or secured to the outer surfaces of respective output members and approximately in contact at all times with respective regions of the end coils at locations 90° from the spring toes 28 and 29 and extending appropriate distances (e.g., 15°) around the respective end coils in each direction from such 90° locations.

Figure 4:
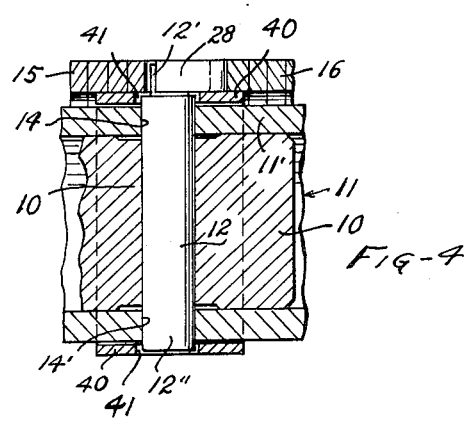
FIG. 4 is a fragmentary sectional view corresponding to FIG. 1 showing an alternative construction.

Alternatively, as shown in FIG. 4, a substantially rigid generally cylindrical metal ring 40 supported to turn freely on the outer peripheral surface of the output shaft or member 11 is disposed radially under one or more of the end coils of each spring and is designed to prevent the undesirable spring end coil deflection. As shown, the ring 40 bridges the proximal end portions of the springs 15 and 16 and is formed with its outer diameter approximately equal to the inner diameters of the associated end coils of the springs as the latter will be contracted in being preloaded against the internal braking surface 17 of drum member 18. In order to retain the ring 40 in position axially of the output member, the ring has one or two openings 41 somewhat larger than the openings 14 and 14' in the output shaft circumferentially of the shaft assembly, and full diameter portions of the cross pin 12 fit loosely in the openings 41. The reason for providing two positioning connections as at 41 between the cross pin 12 and ring 40 is in order to preserve symmetrical abutment relationships between the cross pin and the elongated openings 14 and 14' in the output shaft 11. During operation of the input shaft 10 to reposition the output shaft the inner surface of the end coil or coils embracing the ring 40 will not have to slide thereon while the spring (15 or 16 depending upon the direction of operation) is being deenergized or forced to slide on the brake drum surface 17.

I claim:

1. In a no-back coupling, a normally stationary drum, input and output torque transmitting members coaxial with the drum, a helical friction spring having a free end coil and coils remotely thereof normally in preloaded one way locking contact with the drum, means forming a limited lost motion positive torque transmitting connection between the input and output members including means rotatable with the input member for actuating said free end coil of the spring in consequence of angular relative movement between said members in one direction to deenergize the preloaded coils of the spring, and substantially rigid means peripherally adjacent said free end coil radially opposite the surface portion thereof which faces the drum, said rigid means operating to support said free end of the spring during actuation of said end coil and thereby promote rapid contraction of the preloaded coils.

2. The no-back coupling according to claim 1, wherein the drum is of tubular construction embracing the helical spring and portions of said input and output members, the output member having a tubular wall in telescoping relationship to the input-member, the spring actuating means comprising a cross pin occupying a circumferential slot in said tubular wall for enabling limited relative angular movement of the members and having an abutment surface for engaging the spring formed on a radially projecting end portion adjacent a toe portion of said end coil, said rigid means being constituted by a radially outwardly raised portion of said tubular wall in axially offset relation to said slot and approximately in peripheral contact with a substantial portion of said end coil circumferentially thereof.

3. In bi-directional no-back coupling having an input and an output member in mutually telescoping relationship, a cross pin rigid with the input member and having end portions loosely occupying circumferential slots in wall portions of the output member, a pair of coaxial helical springs around said portions of the output member, connected to that member at their distal end portions and having respective lost motion circumferential abutment connections with the cross pin at proximate end portions of the springs, said coupling further including a brake drum against which coils of both springs are preloaded, the improvement comprising a substantially rigid ring surrounding the output shaft, underlying proximal end coil portions of the respective springs radially close thereto or in contact therewith, and a radial opening in the ring around an end portion of the cross pin to hold the ring against unlimited movement out of position axially of the coupling.

References Cited by the Examiner

UNITED STATES PATENTS

| | | | |
|---|---|---|---|
| 1,934,790 | 11/33 | Brownlee | 192—41 |
| 2,947,278 | 8/60 | Magill et al. | 115—18 |

ARTHUR L. LA POINT, *Primary Examiner.*

DUANE A. REGER, *Examiner.*